United States Patent [19]  
Takasugi et al.

[11] 4,408,900  
[45] Oct. 11, 1983

[54] JOINT STRUCTURE OF BEZEL AND WATCH BODY

[75] Inventors: Tsuneji Takasugi; Seiji Umezawa, both of Tanashi, Japan

[73] Assignee: Citizen Watch Company Limited, Tokyo, Japan

[21] Appl. No.: 255,110

[22] Filed: Apr. 17, 1981

[30] Foreign Application Priority Data

Apr. 24, 1980 [JP] Japan .............................. 55-56166[U]

[51] Int. Cl.³ ............................. B23K 9/12; B23K 9/16
[52] U.S. Cl. .................................... 368/295; 219/118; 219/137 R; 228/175; 228/214; 368/294; 368/296
[58] Field of Search ............... 368/276, 294, 295, 296; 228/175, 214; 219/85 CM, 93, 118, 137 R

[56] References Cited

U.S. PATENT DOCUMENTS 2,625,450 1/1953 Ringsmith .............................. 219/93
3,156,086 9/1961 Egger ................................ 368/295 X Primary Examiner—J. V. Truhe
Assistant Examiner—T. L. Flower
Attorney, Agent, or Firm—Koda and Androlia

[57] ABSTRACT

A joint structure of a watch body and a bezel comprising a watch body with a joint surface, a bezel with a joint surface, at least one projection extending from one of the joint surfaces welded onto the other surface, a space between said surfaces and connecting material filling said space. By thus constructing, the watch body and bezel have a durable water and air tight joint.

10 Claims, 4 Drawing Figures

JOINT STRUCTURE OF BEZEL AND WATCH BODY

BACKGROUND OF THE INVENTION

1. Field of the Invention

This invention relates to a joint structure of a bezel and a watch body.

2. Prior Art

In the prior art there have been known a number of methods for soldering a bezel to a watch body, such as gas soldering, furnace soldering, inductive heat soldering, immersion soldering and electric resistance soldering, etc. These methods can be further subdivided into methods in which the parts as a whole are heated, and methods in which only the joint areas are heated. As far as a watch case is concerned, methods in which only the joint areas are heated are preferred since they do not cause deformation to the watch case. For such purposes, the electric resistance soldering method is desirable. In general, however, the electric resistance soldering method has been considered inappropriate for soldering a broad, continuous joint area because of the difficultly of uniform heating. Specifically, when conventional electric resistance soldering is used on a watch case joint, nonuniform heating leads to heat-induced deformation in the joint areas, resulting in inferior quality. Furthermore, since a large amount of solder is applied, there remains some solder unused on the joint area leading to uneven surfaces.

SUMMARY OF THE INVENTION

Accordingly, it is the primary object of this invention to provide a joint structure of a bezel and a watch body with a very durable, water-air tight joint.

It is another object of this invention to provide a joint structure of a watch body and a bezel without any deformation.

In keeping with the principles of the present invention, the above-mentioned objects are accomplished by a unique joint structure of a bezel and watch body, wherein a joint structure of a watch body and a bezel comprising a watch body with a joint surface, a bezel with a joint surface, at least one projection extending from one of the joint surfaces welded onto the other surface, a space between said surface and connecting material filling said space. By thus constructing, the holding power of the joint is maintained by said projections and air-tight and water-tight integrity of the joint is maintained by the solder.

BRIEF DESCRIPTION OF THE DRAWINGS

The above-mentioned features and objects of the present invention will become more apparent with reference to the following description taken in conjunction with the accompanying drawings wherein like reference numerals denote like elements and wherein.

DETAILED DESCRIPTION OF THE INVENTION

Figure 1A:
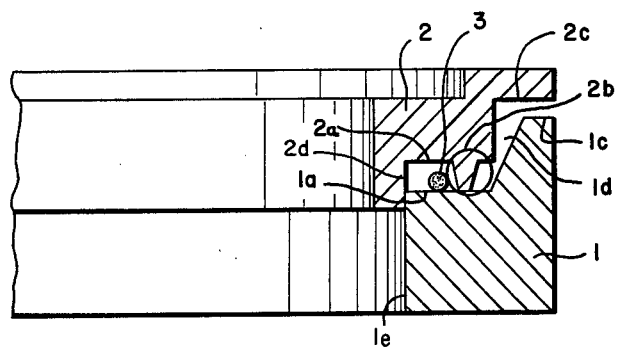
FIG. 1(a) is a partial cross-sectional view showing a bezel and watch body before being joined in accordance with the teachings of the present invention.

Referring to FIG. 1(a), there is shown the basic structure of this invention. A watch body 1 and a bezel 2 are joined together with solder 3. The watch body 1 and the bezel 3 may be made of such material as stainless steel, brass, nickel, silver and the like.

Figure 2:
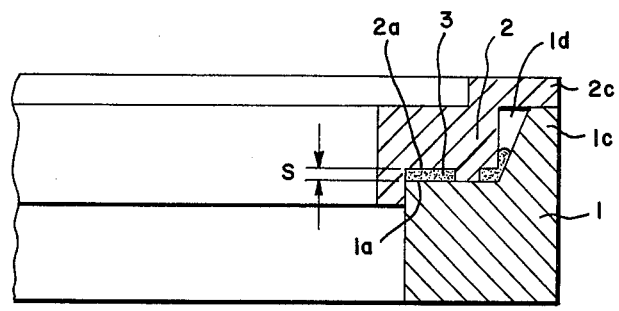
FIG. 2 is a partial cross-sectional view showing the bezel and watch body after being joined to each other.

In FIG. 2, the solder which has melted and then solidified is interposed between the respective joint surfaces 1a and 2a of the watch body 1 and the bezel 2. From the standpoint of solder flow and holding power after being joined, it is preferable that a space S between both joint surfaces 1a and 2a be maintained between 0.02 mm and 0.1 mm. For this reason, the upper end 1c of the watch body 1 is caused to contact the peripheral portion 2c of the bezel 2 so that a stopper action is achieved. In this way, the space S between the joint surfaces 1a and 2a of the watch body 1 and bezel 2 is maintained.

Furthermore, if a cutout space 1d, which acts as a reservoir, is formed around the entire inner periphery of the watch body 1 adjacent to the joint surfaces as shown in FIG. 2, solder flow can be reliably prevented.

Figure 1B:
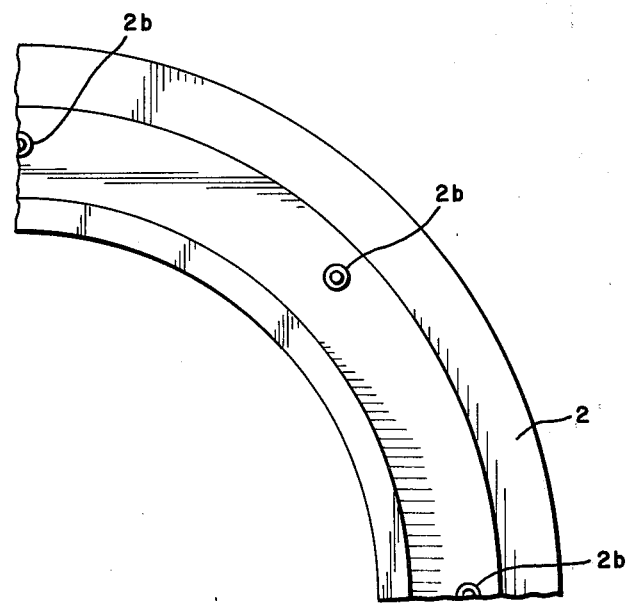
FIG. 1(b) is a partial bottom view of the bezel.
Figure 3:
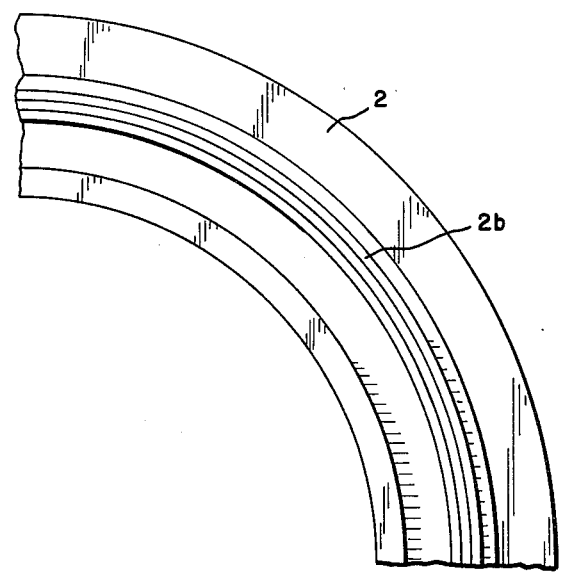
FIG. 3 is a partial bottom view of the bezel which illustrates another embodiment of a projection in accordance with the teachings of the present invention.

As shown in FIG. 1(b), a plurality of projections 2b are formed on the joint surface 2a of the bezel 2. Alternatively, a single continuous ring-form projection may be formed along the entire periphery of the bezel 2 as shown in FIG. 3.

In order to joint the bezel 2 to the watch body 1, a ringform piece of solder 3 is placed between the joint surfaces 1a and 2a of the watch body 1 and bezel 2. With this solder 3 in place the watch body 1 and bezel 2 are connected to electrodes, and voltage is applied so that a low-voltage high-amperage electric current is caused to flow through said parts. The waveform of the electric current may be an ordinary alternating-current waveform; however, a pulsed current is more desirable. As a result, the parts are heated during the initial stage of electric current flow by the contact resistance between the watch body 1 and the contact surfaces of the projections 2b formed on the joint surface 2a of the bezel 2. Subsequently, uniform heating is caused by the intrinsic resistances of the joint surface 1a of the watch body 1, the joint surface 2a of the bezel 2, and the solder 3. Specifically, a special feature of this electric resistance heating process is that the solder 3, joint surface 1a of the watch body 1 and joint surface 2a of the bezel 2 are all heated to the same temperature. Furthermore, a capillary action is generated between the two joint surfaces 1a and 2a so that the solder 3 is spread across the entire area of each joint surface. The excess solder pools in the cutout space 1c, so that no solder 3 escapes into areas where solder 3 is not needed.

Furthermore, the holding power of the joint between the watch body 1 and bezel 2 is stabilized and maintained by the projections 2b formed on the joint surface 2a of the bezel 2. Though in the embodiment described above, projections 2b are formed on the joint surface 2a of the bezel 2, there would be no objection to forming these projections 2b on the joint surfaces 1a of the watch body 1.

As is described above, the joint structure provided by this invention makes it possible to achieve uniform heating across the joint surfaces of the watch body and bezel with said watch body and bezel maintained at the minimum sufficient temperature. This invention also makes it possible to obtain a joint between the watch body and bezel which is superior in terms of air-tight and water-tight integrity. In this invention, furthermore, there is no danger that the heating will cause deformation of the watch body or bezel. Accordingly, this invention is useful for joining finished parts. Furthermore, the projections formed on the joint surface of the bezel or watch body, and the space formed between the joint surfaces in order to maintain the capillary effect required for soldering insure that the solder will spread evenly across the joint surfaces, so that a watch body which is extremely superior in terms of air-tight integrity, water-tight integrity and holding power can be produced.

In all cases it is understood that the above described embodiments are merely illustrative of but a few of the many possible specific embodiments which represent the applications and principles of the present invention. Numerous and varied other arrangements may be readily devised by those skilled in the art without departing from the spirit and scope of the present invention.

We claim:

1. A joint structure of a watch body and a bezel comprising:
   a watch body having a joint surface;
   a bezel having a joint surface;
   at least one projection extending from one of said joint surfaces, said projection being welded onto the other joint surface;
   a space between said joint surface; and
   connecting material filling said space provided in the proximity of said projection, wherein said connecting material is melted by the heat and fills said space when said projection is welded.

2. A joint structure of a watch body and a bezel according to claim 1, wherein said connecting material is solder.

3. A joint structure of a watch body and a bezel according to claim 2, wherein said space is larger than the volume of said solder.

4. A joint structure of a watch body and a bezel according to claim 2, wherein said watch body has a stopper at the end thereof to engage with the end of said bezel.

5. A joint structure of a watch body and a bezel according to claim 2, wherein said projection is extending from said bezel.

6. A joint structure of a watch body and a bezel according to claim 2, wherein said projection is extending from said watch body.

7. A joint structure of a watch body and a bezel according to claim 2, wherein said projection has a ring-shape.

8. A joint structure of a watch body and a bezel according to claim 2, wherein the distance between said joint surfaces is between 0.02 mm–0.1 mm.

9. A joint structure of a watch body and a bezel according to claim 2, wherein said bezel has a guide portion engaging an inner surface of said watch body.

10. A joint structure of a watch body and a bezel according to claim 2, wherein said solder has a thickness less than a distance between the respective joint surface of said watch body and bezel before said solder is melted.

* * * * *